US006173429B1

(12) United States Patent
Twitchell et al.

(10) Patent No.: US 6,173,429 B1
(45) Date of Patent: Jan. 9, 2001

(54) APPARATUS FOR PROVIDING ERROR CORRECTION DATA IN A DIGITAL DATA TRANSFER SYSTEM

(75) Inventors: Edwin Ray Twitchell; Paul Mizwicki; Joseph Lee Seccia, all of Quincy, IL (US)

(73) Assignee: Harris Corporation, Melbourne, FL (US)

( * ) Notice: Under 35 U.S.C. 154(b), the term of this patent shall be extended for 0 days.

(21) Appl. No.: 08/818,961

(22) Filed: Mar. 14, 1997

(51) Int. Cl.[7] ..................................................... G06F 11/00
(52) U.S. Cl. ........................ 714/746; 714/759; 714/784; 714/792; 714/800
(58) Field of Search .................................. 714/746, 759, 714/784, 792, 800

(56) References Cited

U.S. PATENT DOCUMENTS

| | | | | |
|---|---|---|---|---|
| 3,975,712 | * | 8/1976 | Hepworth et al. ................ | 714/800 |
| 4,471,480 | * | 9/1984 | Haussmann et al. ............. | 370/242 |
| 4,564,945 | * | 1/1986 | Glover et al. .................... | 714/769 |
| 4,637,022 | * | 1/1987 | Burke et al. ..................... | 714/784 |
| 4,642,808 | * | 2/1987 | Baggen ............................ | 714/784 |
| 4,716,567 | * | 12/1987 | Ito et al. .......................... | 714/753 |
| 4,748,626 | * | 5/1988 | Wong ............................... | 714/746 |
| 4,866,719 | * | 9/1989 | Morgan et al. .................. | 714/704 |
| 4,980,897 | * | 12/1990 | Decker et al. ................... | 375/265 |
| 5,068,856 | * | 11/1991 | Nagasawa et al. ............... | 714/756 |
| 5,195,093 | * | 3/1993 | Tarrab et al. .................... | 714/703 |
| 5,212,695 | * | 5/1993 | Shikakura et al. ............... | 714/759 |
| 5,222,077 | * | 6/1993 | Krishnan .......................... | 375/261 |
| 5,377,207 | * | 12/1994 | Perlman .......................... | 714/784 |
| 5,497,404 | * | 3/1996 | Grover et al. ................... | 348/845.1 |
| 5,586,128 | * | 12/1996 | Chen ............................... | 714/792 |
| 5,627,844 | * | 5/1997 | Cho ................................. | 714/759 |
| 5,805,854 | * | 9/1998 | Shigeeda ......................... | 365/201 |
| 5,825,807 | * | 10/1998 | Kumar ............................. | 375/200 |
| 5,901,159 | * | 5/1999 | Ichikawa ......................... | 714/765 |
| 5,910,960 | * | 6/1999 | Claydon et al. ................. | 714/784 |
| 6,032,284 | * | 2/2000 | Bliss ................................ | 714/792 |

* cited by examiner

Primary Examiner—Emmanuel L. Moise
Assistant Examiner—Guy Lamarre
(74) Attorney, Agent, or Firm—Tarolli, Sundheim, Covell, Tummino & Szabo L.L.P.

(57) ABSTRACT

The present invention provides an apparatus for providing error correction data in a digital data transfer system. The apparatus receives a clock signal and provides a first signal using the clock signal. Information data is received and a second signal is provided using the information data. The information data is received in groups which each have a first predetermined number of elements. A plurality of αROMs provide Galois Field multiples in look-up tables. The αROMs are addressed using the first signal to provide a first address component and using the second signal to provide a second address component. Modula mathematics are performed utilizing the values from the αROMs to generate error correction data. The error correction data is in groups each having a second predetermined number of elements. A RAM is accessible by a Trellis encoder and has an array for holding the information data elements and error correction data elements. The number of array locations is equal to an integer multiple of the sum of the first and second predetermined numbers. Further, the information and error correction data elements are sent to the RAM in third groups. A first array location always receives a first element of one of the third groups of data. Thus, the data is easily interleaved by the Trellis encoder.

57 Claims, 3 Drawing Sheets

APPARATUS FOR PROVIDING ERROR CORRECTION DATA IN A DIGITAL DATA TRANSFER SYSTEM

TECHNICAL FIELD

The present invention is generally directed to a digital data transfer system and is particularly directed to a digital television transmission system in which errors in digital data are detected and corrected.

BACKGROUND OF THE INVENTION

Various systems, such as data communication systems and data processing systems, transfer digital data. Examples of data transfers include a transmission of data from a source location to a remote location within a communication system, and a storage/retrieval cycle of data within a processing system. Various influences can cause corruption of the data. For example, communication systems often transmit data across great distances through the atmosphere. Atmospheric conditions, such as lightning, can disrupt the data signal.

Various techniques have been developed for increasing the probability of error free data transfer. One example technique is based upon the inclusion of error correction data with the information (i.e., the original) data to provide error correction code words. Correction of erroneous information data at the destination (e.g., upon receipt or retrieval) is possible by mathematically reconstituting correct code words. To construct a code word, error correction data, often referred to as parity, is derived from the original data. The parity, in essence, mathematically characterizes the pattern of the original data. Upon receipt or retrieval, a decoder, using the parity, examines and manipulates the data in a fashion to detect, locate, and correct errors which have occurred therein.

A particular error detecting and correcting technique is directed to algebraic block codes wherein binary numbers are utilized to represent elements in a finite or Galois Field. A Galois Field ($2^M$) has $2^M$ elements, in which each element is M bits in length. The Galois Field elements may be considered as binary vectors representing data words or "symbols". Typically, such Galois Field elements are multiplied in processes used to encode and decode messages for error correction purposes. Galois Field multiplication is fundamental in algebraic code techniques, but usually involves complicated operations. Some known Galois Field multipliers are decidedly too complex or too specialized, and thus of limited capability.

Modern data systems transfer a relatively large amount of data in a relatively short period of time. The modern systems have large data throughput, and thus have high error correction requirements. For example, television transmission systems which operate within the advanced television system standard (hereinafter referred to as "ATSS") require a Reed-Solomon encoder utilizing Galois Field type error correction. The typical Reed-Solomon encoder operating within the ATSS must accept 187 eight-bit bytes of information data and generate 20 eight-bit bytes of error correction data (i.e., parity). To accomplish this requires a lengthy polynomial multiplication sequence as well as significant growth in signal data rate. Some known Galois Field multipliers are relatively slow and, as a result, may be unable to operate at the speed necessary to support the required data rates.

SUMMARY OF THE INVENTION

The present invention provides an apparatus for providing error correction data in a digital data transfer system. In accordance with one aspect of the present invention, the apparatus includes means for receiving a clock signal and means for providing a first signal using the clock signal. The apparatus includes means for receiving information data and a means for providing a second signal using the information data. The apparatus includes memory means for holding values. The memory means has a plurality of addressable memory locations and each memory location contains a value. Means address the memory means using the first signal to provide a first address component and using the second signal to provide a second address component. Mathematics means of the apparatus perform mathematics utilizing a value from the memory means to generate error correction data.

In accordance with another aspect of the present invention, the apparatus includes means for receiving information data. The information data is received in groups which each have a first predetermined number of elements. Means generate error correction data in response to the information data. The error correction data is in groups each having a second predetermined number of elements. Memory means of the apparatus are accessible by a portion of the system other than the apparatus and hold the information data elements and the error correction data elements. The accessible memory means includes memory array means having a plurality of array locations, each array location for holding an element. The number of array locations is equal to an integer multiple of the sum of the first and second predetermined numbers.

In accordance with a further aspect of the present invention, the apparatus includes means for receiving a clock signal and means for providing control signals using the clock signal. The apparatus includes means for receiving information data elements in first groups. Means generate error correction data elements using the information data elements and a control signal from the means for providing control signals. The error correction data elements being in second groups. Memory means of the apparatus include memory array means having a plurality of array locations for holding the information data and the error correction data elements. Means send information data elements and error correction data elements to the accessible memory means in third groups. Means control the means for sending in response to a control signal from the means for providing control signals to cause a first array location of the memory means to always receive a first element of one of the third groups of the information data and the error correction data.

DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

Figure 1:
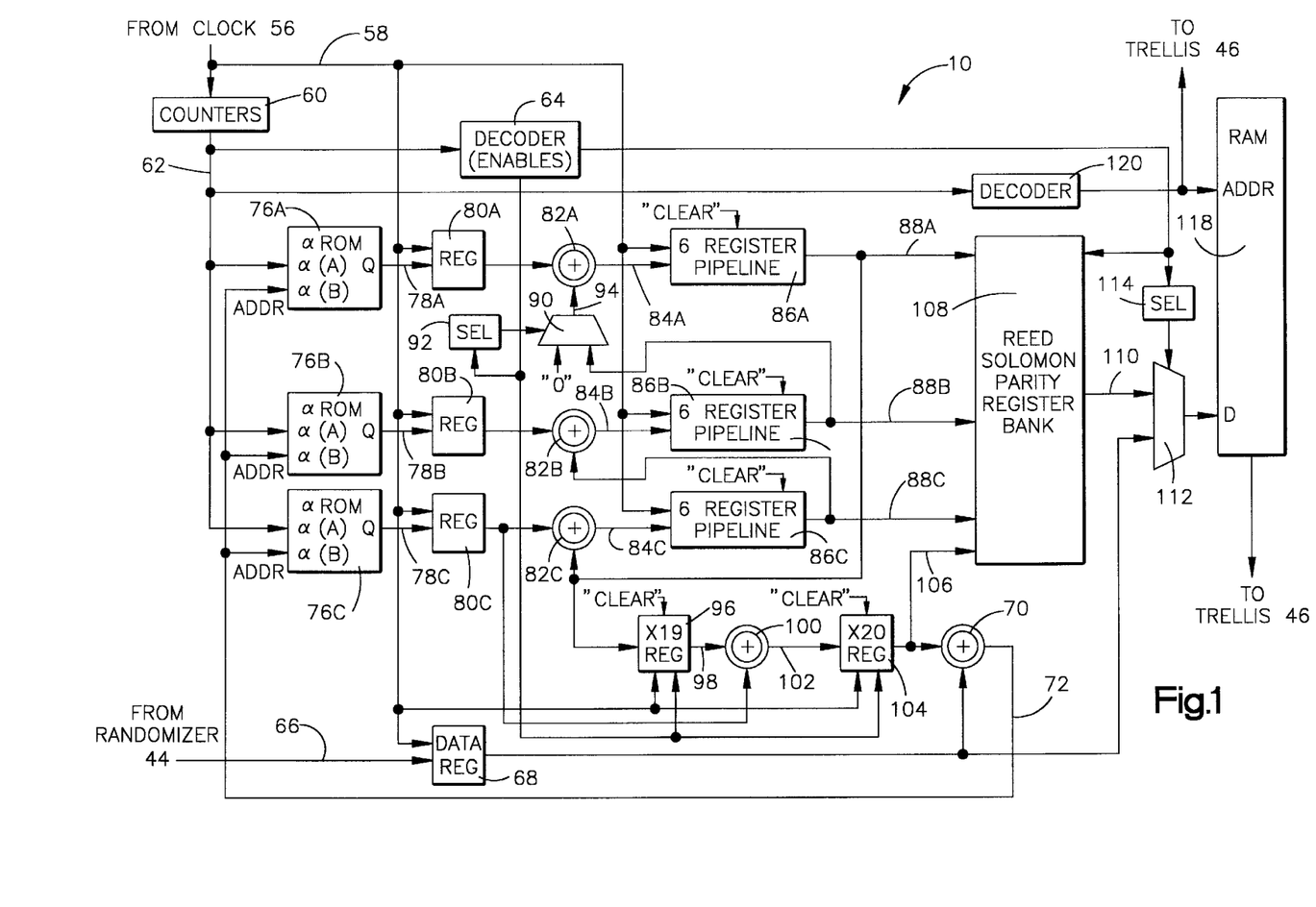
FIG. 1 is a schematic illustration of an apparatus in accordance with the present invention.

One representation of the present invention is schematically shown in FIG. 1 as an apparatus 10 for providing error correction data (e.g., parity) for information data. In the preferred embodiment, the error correction data provided by the apparatus 10 is Reed-Solomon code and thus the apparatus is a Reed-Solomon encoder. Of course, a person of ordinary skill in the art will appreciate that the present invention is applicable to other types of error correction devices.

The Reed-Solomon encoder 10 according to the present invention provides error correction data for information data which is received at a relatively high rate and which is received in relatively large incoming groups (e.g., frames). For example, the incoming information data rate is 19.39 megabytes per second. Further, the information data is grouped in frames which each contain 187 eight-bit bytes of information. Because of the relatively large size of the group of information within each data frame, a relatively large number of error correction data bytes (e.g., parity) must be generated. For example, for the 187 information byte incoming frame, 20 bytes of error correction data must be generated. Thus, a person of ordinary skill in the art will appreciate that a lengthy Galois Field polynomial is involved, and that significant growth of the signal data rate occurs.

Figure 2:
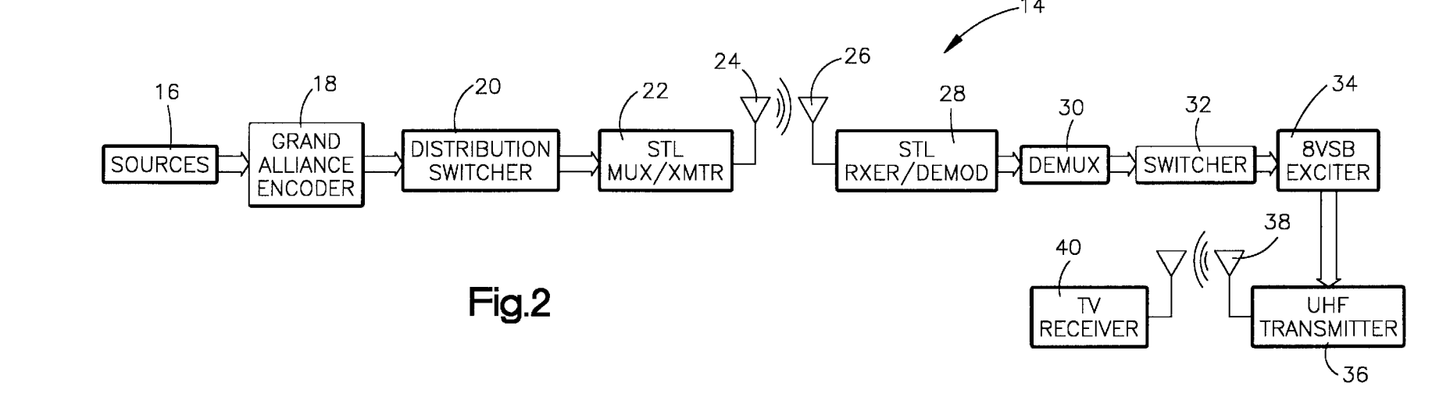
FIG. 2 is a schematic illustration of an example device in which the present invention is utilized.

The high data rate and large byte group size are related to the system environment in which the Reed-Solomon encoder 10 is utilized. Accordingly, the Reed-Solomon encoder 10 of the present invention may be used in any system having such demanding requirements. For example, the Reed-Solomon encoder 10 may be utilized in a high definition television (HDTV) system 14, as shown in FIG. 2. The HDTV system 14 includes a plurality of sources 16, such as a camera unit, a storage unit, or a receiver unit (e.g., a satellite down-link). Signals from the sources 16 are provided to a grand alliance encoder 18. The signal from the grand alliance encoder 18 is provided to a distribution switcher 20, which provides a signal to a STL multiplexer/transmitter 22.

A microwave link is established between source and remote microwave antennas 24 and 26, and a signal from the remote antenna 26 is provided to a STL receiver/demodulator 28. The signal proceeds through a demultiplexer 30 and a switcher 32 to an 8VSB exciter 34. The 8VSB exciter 34 contains the Reed-Solomon encoder 1.0 (FIG. 3) in accordance with the present invention. The output of the 8VSB exciter 34 (FIG. 2) is provided to a UHF transmitter 36 and a broadcast signal from a broadcast antenna 38 is received at a television 40. A person of ordinary skill in the art will appreciate the flow of signals within the HDTV system 14.

Figure 3:
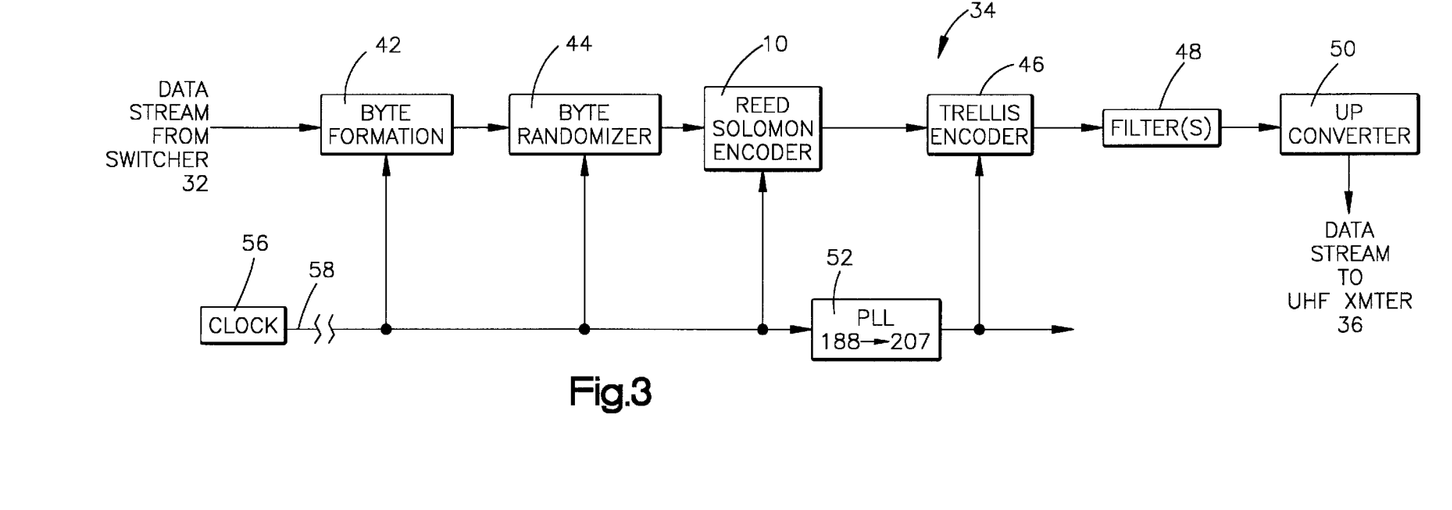
FIG. 3 is a schematic illustration of a portion of the device shown in FIG. 2 which contains the apparatus of the present invention.

Turning now to the details of the example 8VSB exciter 34 shown within FIG. 3, the data stream is received from the switcher 32 and proceeds to a byte formation device 42 and then to a byte randomizer device 44. The data stream proceeds through the Reed-Solomon encoder 10 and error correction data is added to the data stream. As the data stream proceeds to a Trellis encoder 46, the data is interleaved. The data stream subsequently passes through one or more filters 48.

Within the 8VSB exciter 34, a clock 56 provides a clock signal 58. In the preferred embodiment, the clock 56 is the transport layer bit rate clock. Further, in the preferred embodiment, the bit clock 56 operates at approximately 19.39 MHz. Accordingly, with reference to an eight-bit byte, the clock 56 is operating for each byte at approximately 2.42 MHz.

The clock signal 58 is utilized by the components of the 8VSB exciter 34. However, it will be appreciated upon viewing FIG. 3 that a data rate expansion occurs between the Reed-Solomon encoder 10 and the Trellis encoder 46. The clock signal 58 from the clock 56 is used at the Trellis encoder 46, and downstream, via a PLL 52 which steps up the clock signal 58. The step-up is to accommodate the increase caused by the addition of the error correction data (e.g., 20 bytes in the preferred embodiment).

Referring again to FIG. 1, the details of the Reed-Solomon encoder 10 in accordance with the present invention will be appreciated. The Reed-Solomon encoder 10 includes six generalized portions. These portions deal with (1) clock counter/control signals, (2) the information data stream, (3) ROM memory, (4) parity generation, (5) a RAM accessible by the Trellis encoder, and (6) control of writing to, and reading from, the RAM. The functional interrelationship of these portions within the Reed-Solomon encoder 10 will be apparent upon further reading of this description.

The clock signal 58 is provided to counters 60 which provide counter signals 62. In the preferred embodiment, there are two modula counters 60. The modula counters count through cycles related to the lengths of incoming and outgoing frames of data in the data steam, as will be understood upon further reading. In the preferred embodiment, the first modula counter 60 is a modula 52 counter (i.e., 0–51) and the second counter 60 is a modula 1242 counter (i.e., 0–1241). The counter signals 62 are used to control operation of the Reed-Solomon encoder 10. At least one of the counter signals 62 is supplied to a decoder 64 which provides a plurality of enable signals.

The Reed-Solomon encoder 10 receives the data stream, which contains information data 66, from the randomizer device 44. Each incoming frame contains a start pattern (e.g., one byte) and the information data 66 (e.g., 187 bytes). The incoming information data 66 passes into a data register 68, and is "clocked out" of the data register 68 via control from the clock signal 58 (e.g., byte rate at approximately 2.42 MHz). As the information data 66 proceeds through the Reed-Solomon encoder 10, each byte of the incoming information data 66 is sequentially supplied as one input to a modula add device 70. In the preferred embodiment, the modula add device 70 includes eight exclusive OR gates in parallel. The output of the modula add device 70 is a signal 72 which is based upon the information data 66.

The Reed-Solomon encoder 10 of the present invention has a plurality of αROMs 76. Each of the αROMs 76 contains a table of values of Galois Field multiplication products. The values within the ROM tables are accessed by addressing the αROMs 76 utilizing the data based signal 72 and at least one of the counter signals 62. The addressing is done in parallel.

In a preferred embodiment, the counter signal 62 from the second modula counter 60 is used as a first portion of the ROM addresses (i.e., the address portion α(A)). In the preferred embodiment, only the three least significant digits of the count numbers are used for the first portion of the ROM addresses. It will be appreciated by a person of ordinary skill in the art that a separate counter could be used to provide the numbers provided by the second modula counter 60. Further, in the preferred embodiment, the data based signal 72 is an eight byte number which is used as another portion of the ROM addresses (i.e., the address portion α(B)). Upon being addressed, each of the αROMs 76 provides an output signal 78 containing a value from its table. A person of ordinary skill in the art will appreciate that the values from the αROMs 76 are related to the information data 66 and the counter value.

The αROMs 76 provide the advantage of avoiding Galois Field multiplication. Accordingly, the Reed-Solomon encoder 10 operates at a faster pace and with less custom logic than -if Galois Field multiplication was performed. Further, the speed with which the Reed-Solomon encoder 10 operates is related to the number of αROMs 76. Any number of αROMs 76 could be used. In the example shown in FIG. 1, there are three αROMs 76, which are identified by suffixes A–C. For purposes of discussion herein only, the αROMs 76A–76C are,referred to as first-third, respectively. The number of αROMs 76 is inversely proportional to the number of clock cycles needed to retrieve the necessary Galois Field products. Even a single αROM could be utilized, but would necessarily increase the number of clock cycles required to retrieve the needed Galois Field products.

The output signal 78 of each αROM 76 is provided to an associated register 80. Furthermore, in the preferred embodiment, because there are three αROMs 76a–76c, there are three associated registers 80, identified by the suffixes A–C, respectively. It is to be understood that the registers 80 are not necessary for a proper operation of the present invention, but provide a useful buffer action for proper sequencing and timing. Specifically, the registers 80 are controlled by the clock signal 58.

The Galois Field product values from the αROMs 76 are supplied, via the registers 80, as one input to an associated modula add device 82. There are three modula add devices 82, which are identified by suffixes A–C, respectively. For purposes of discussion herein only, the, modula add devices 82A–82C are referred to as first-third, respectively. In the preferred embodiment, each modula add device 82 is identical to the modula add device 70, and thus each includes eight, parallel exclusive OR gates. The modula add devices 82 perform Galois Field addition using the Galois Field product values from the αROMs 76.

The output 84 of each of the modula add devices 82 is provided to an associated register pipeline 86. There are three register pipelines 86, which are identified by the suffixes A–C, respectively. For purposes of discussion herein only, the register pipelines 86A–86C are referred to as first-third, respectively. Each of the register pipelines 86 contains six registers in series. The register pipelines 86 provide a total of 18 registers. Successive outputs 84 from the associated modula add device 82 (e.g., 82A) are shifted sequentially through each register pipeline 86 (e.g., 86A), via control provided by the clock signal 58.

The output 88A of the first register pipeline 86A is the second input to the third modula add device 82C. The output 88C of the third register pipeline 86C is the second input to the second modula add device 82B. The output 88B of the second register pipeline 86B is one input to a multiplexer 90.

Another input to the multiplexer 90 is a constant LOW (i.e., zero) signal. A select line 92 of the multiplexer 90 is controlled by an enable signal coming from the decoder 64. Accordingly, control of the multiplexer 90 depends upon at least one of the counter signals 62, and depends ultimately the clock signal 58. The output 94 of the multiplexer 90 is provided as the second input to the first modula add device 82A.

The output of the first register pipeline 86A is also provided as an input to a 19th register 96. Operation of the 19th register 96 to accept a data byte is controlled both by the clock signal 58 and an enable signal from the decoder 64. An output 98 from the 19th register 96 is provided as a first input to a modula add device 100. The modula add device 100, in the preferred embodiment, is the same as the modula add device 70 and thus includes eight, parallel exclusive OR gates. A second input to the modula add device 100 is the output 78C from the αROM 76C.

The output 102 from the modula add device 100 is provided to a 20th register 104. The 20th register 104 is controlled both by the clock signal 58 and an enable signal from the decoder 64. The output 106 of the 20th register 104 is provided as the second input to the modula add device 70. Thus, the output of the 20th register 104 is used in conjunction with the information data 66 to generate the data based signal 72, which is used to address the αROMs 76.

The outputs 88A–88C from the pipeline registers 86A–86C and the output 106 from the 20th register 104 are provided to a Reed-Solomon parity register bank 108. The register bank 108 is controlled by an enable signal coming from the decoder 64. The register bank 108 accepts the necessary bytes of Reed-Solomon error correction data once the error correction data is generated. In the preferred embodiment, 20 bytes of Reed-Solomon error correction data are necessary. In accordance with the preferred embodiment, the register pipelines 86 contain eighteen of the 20 total bytes and the 19th and 20th registers 96, 104 contain the other 2 bytes of error correction data at the end of the generation process, and the register bank 108 accepts the 20 bytes at the end of the generation process.

Generation of the error correction data for each incoming frame of information data 66 (i.e., the 187 bytes) begins immediately. Specifically, the information data 66 is supplied to the modula add device 70, which provides the data based signal 72. The data based signal 72 is supplied as a portion of an address to each of the αROMs 76. Simultaneously, the clock signal 58 drives the counters 60, and the counters provide the counter signals 62. The appropriate portion of the counter signals 62 is provided to the αROMs 76 as the other component of the address to each of the αROMs 76.

The values retrieved from the αROM are supplied, via the registers 80 (if present), to the modula add devices 82. The outputs 84 from the modula add devices 82 are provided to the register pipelines 86 for storage therein. Further, as the operation progresses, previous modula add outputs are supplied to the other modula add devices 82, as will be appreciated by the flow shown within FIG. 1. Within each modula add device, the bits of the two inputs are modula added, e.g., most significant bit with most significant bit, etc.

As the Reed-Solomon encoder 10 progresses through operation on the current information data 66 (e.g., 187 bytes), Galois Field values are accumulated within the registers (i.e., the register pipeline, and the 19th and 20th registers). Modula add arithmetic and shifting of values within the registers continues as the operation progresses toward a final solution. Once the Reed-Solomon encoder 10 finishes operating upon the current information, the pipeline registers 86, and the 19th and 20th registers 96, 104 hold the desired 20 bytes of error correction data (i.e., the parity). The 20 bytes of error correction data are then transferred to the register bank 108.

The transfer from the register pipelines 86, and the 19th and 20th registers 96, 104 may be in any suitable fashion. For example, the next six clock byte cycles may be used to empty the register pipelines 86 and, of course, to empty the 19th and 20th registers 96, 104. The register pipelines 86, and the 19th and 20th registers 96, 104 are subsequently cleared. The control of the clear lines can be provided by the divider 64.

The output 110 from the register bank 108 is the error correction data, and is supplied to a first input of a multiplexer 112. The other input to the multiplexer 112 is the information data 66 which is being clocked out by the data register 68. The select line 114 of the multiplexer 112 is controlled by an enable signal coming from the decoder 64. Accordingly, the output 116 from the multiplexer 112 is controlled by at least one of the counter signals 62, and ultimately the clock signal 58.

The multiplexer 112 supplies both the information data 66 and the error correction data 110 to a RAM 118. A person of ordinary skill in the art will appreciate that the information data 66 which is supplied to the RAM by the multiplexer 112 is from the current incoming frame or sequence of information data. Thus, the information data can be considered to be supplied to the RAM 118 in a real time or a near real time manner. In the preferred embodiment, the information data 66 is supplied to the RAM at the frequency that the information data is provided to the multiplexer 112 (i.e., at the frequency that the data register 68 clocks out the information data 66). Accordingly, in the preferred embodiment, the transfer of the information data 66 to the RAM is controlled by the clock signal 58.

It will be further appreciated by a person of ordinary skill in the art that the error correction data 110, which is supplied to the RAM 118 via the multiplexer 112, is error correction data for information data 66 already supplied to the RAM. Specifically, the information data 66 is systematically supplied to the RAM 118 while its associated error correction data 110 is still being generated.

With the addition of the error correction data 110, the rate of the overall data stream must be increased. In a preferred embodiment, the rate expansion is to accommodate the added 20 bytes of error correction data for each 187 bytes of information data. In order to accomplish the required increase in the data rate, the Reed-Solomon encoder 10 of the present invention must write the total data (information and error correction) in the time period for reception of the information data by the Reed-Solomon encoder. Accordingly, in the present invention, the data is written to the RAM 118 at a stepped up rate.

For example, the multiplexer 112 is utilized to write to the RAM 118 at a rate twice as fast as the information data receipt rate for a portion of time. Specifically, if the information data 66 is written at a constant rate, equal to the rate that the information data is received, the error correction data 110 is written into the RAM 118 interspersed with writing of the information data. An example of this interspersion is an alternation (i.e., alternate information and error correction), for a first 20 bytes of information data within a sequence. It will be appreciated by a person of ordinary skill in the art that other writing sequences could be used. For example, other patterns of interspersing information data and error correction data could be used, or a burst mode of writing all or part of the error correction data at any point along the writing of the information data could be used.

In accordance with the present invention, the RAM 118 accommodates the expansion in data which occurs because of the addition of the error correction data 110. Further, in accordance with the present invention, the RAM 118 accommodates an easy form of interleaving upon reading of the data from the RAM 118. These functions in accordance with the present invention are accomplished by (1) particular size of the RAM 118 and (2) particular addressing of the RAM, both for writing into the RAM and reading out of the RAM.

With regard to the size of the array, it is to be now realized that the multiplexer 112 repeatedly supplies groups of data bytes to the RAM 118. In the preferred embodiment, the size of the group of data bytes is 207. Thus, in accordance with the present invention, the RAM 118 has a memory array (example shown in FIG. 4) which is sized (i.e., number of array locations, each array location for holding a data byte) to accommodate repeated reception of the groups of data bytes (i.e., 207 bytes). Further, in accordance with the present invention, easy interleaving is accomplished by reading from the RAM 118 in a sequence, proceeding through array locations, that is different from the sequence in which data bytes are written to the RAM. Such easy interleaving is difficult if the configuration of the array is such that writing to the array does not have a repeated pattern which is "known" to the device (i.e., the Trellis encoder 46) which reads from the RAM 118.

Figure 4:
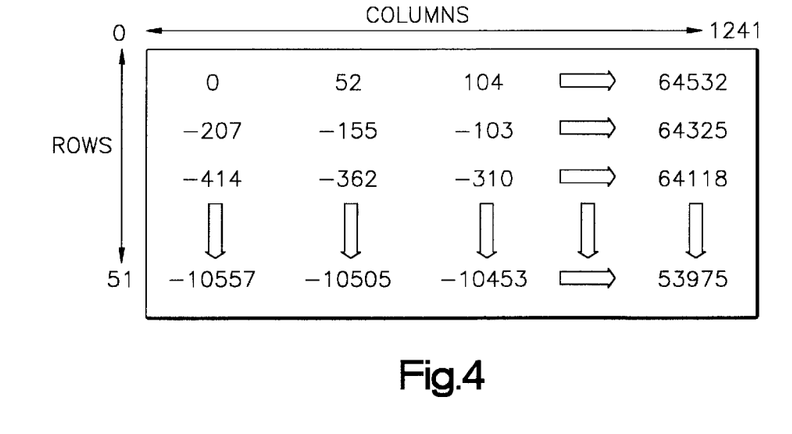
FIG. 4 is an illustration of a memory array within the apparatus of the present invention.

Accordingly, to accomplish the two aspects set forth above, the memory,array of the RAM 118 is sized such that the number of array locations is an integer multiple of the group size (e.g., 207 bytes) written to the ram. Further, the Trellis encoder 46 reads from the RAM 118 in a pattern which is related to the array size and, thus, the pattern of writing to the RAM. In the preferred embodiment, the RAM 118 has 64,584 array locations, which is the result of multiplying the incoming (i.e., written) group size of 207 by the integer 312. Accordingly, the multiplexer 112 supplies 312 groups of data before it is necessary to rewrite a starting location. Further, in the preferred embodiment of the invention, the array is arranged to have 52 rows (i.e., 0–51) and 1,242 columns (i.e., 0–1241). Thus, the first array location always receives a first element of a group. In the preferred embodiment, the frame size at the Trellis encoder 46 is 828 two-bit bytes, and there are 312 frames. Accordingly, there is a correspondence for writing and reading (i.e., 828 divided by four, to compensate for the difference in byte sizes, equals 207, and 207 multiplied by the frame size of 312 equals 64,584).

The simple and easily repeatable addressing is accomplished by using the counter signals 62 and a decoder 120. The signal 62 from one of the counters 60 is used to provide a row address and the signal from the other of the counters is used to provide a column address. Further, one of the counter signals is decoded for an address portion. As will be recalled, the counters 60 includes two modula counters. In the preferred embodiment, the first modula counter (modula 52) directly provides the row address and the second modula counter (modula 1242) is decoded by the decoder 120. The decoded signal is the column address.

Use of the counters 60 for the array addresses causes sequentially written bytes to be dispersed throughout the array. The example of the dispersion within the array is shown in FIG. 4. The difference between each of the columns is 52 and the difference between each of the rows is 208.

Because the size of the array is related to the size (e.g., 207 bytes) of the group of data bytes to be written to the RAM 118, the counters which are used to address the RAM are the same counters 60 used to control generation and transfer of the error correction data. Further, because sequentially written bytes are dispersed within the array of the RAM 118, interleaving is easily accomplished by reading sequential array locations. For example, in the preferred embodiment, the Trellis encoder 46 reads from the array of the RAM 118 sequentially along each column and then proceeds to an adjacent column. All that is needed is sufficient column offset between the RAM reading and writing functions. Specifically, a read/write line (FIG. 5) for the RAM is used to signal the Trellis encoder 46 when to read.

It will be appreciated by a person of ordinary skill in the art that the writing to the RAM 118 and the reading from the RAM is performed by two asynchronous controllers and that some handshaking requirements are present to ensure that no bus contention occurs and that data read is not corrupted by new writes. Accordingly, the read/write signal is used not only to control memory function, but to indicate to a controller of the Trellis encoder 46 when data can be read. Further, the column address line (e.g., the second modula counter 60) can also be used as an input to the controller of the Trellis encoder 46 to indicate the approximate location of current writes. The controller of the Trellis encoder 46 itself can then generate an optimum address offset to ensure no data collisions. It is to be noted that, in the shown embodiment, the column address line is used by the Trellis encoder 46. As an alternative to structure of the shown embodiment, the counter signal from the second modula counter (i.e., prior to decoding) could be used by the Trellis encoder 46.

Figure 5:
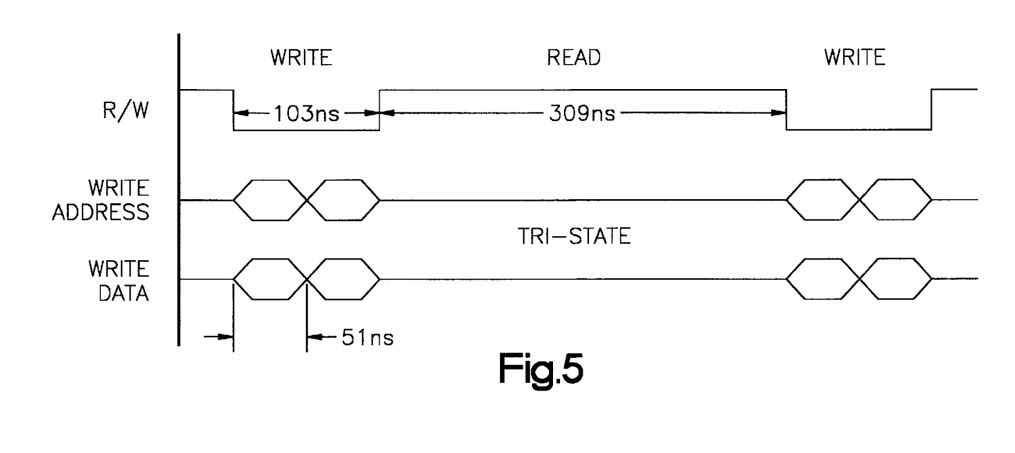
FIG. 5 is an example of a read-write timing sequence for the memory array shown in FIG. 4.

The read/write line can be latched by the column address line, i.e., from the second counter 60. As shown in the example of FIG. 5, write operations to the RAM 118 can occur when the read/write line goes LOW. In the example, two data bytes are written within a 103 nanosecond time period. Read operations take place any time during a tri-state window (read/write line HIGH) which is shown in the example as being of a 309 nanosecond time period. Multiple read operations can be performed during one tri-state cycle as long as access times are accommodated.

In view of the above description, a person of ordinary skill in the art will appreciate that one unique aspect of the present invention is in the way that a Reed-Solomon encoder 10 uses a base rate clock in conjunction with look-up tables to perform encoding. Also, a person of ordinary skill in the art will appreciate that another unique aspect of the present invention is that the RAM 118 serves a dual purpose in that it allows easy and continuous RAM operation, as well as accommodating easy data interleaving.

From the above description of the invention, those skilled in the art will perceive improvements, changes and modifications. For example, in the shown embodiment, the counter signals 62 are used to provide RAM addresses for writing, and reading is in array-based sequence. As an alternative to this, the counter signals 62 could be used for RAM reading, with the writing being in an array-based sequence. This alternative would provide the desired easy interleaving. As another example, instead of using the two modula counters 60 and their counter signals 62 for addressing, one modula counter of modula 64,584 could be used for addressing. Such improvements, changes and modifications within the skill of the art are intended to be covered by the appended claims.

Having described the invention, we claim the following:

1. An apparatus for providing error correction data in a digital data transfer system, said apparatus comprising:
   means for receiving a clock signal;
   means for providing a first signal using the clock signal;
   means for receiving information data;
   means for providing a second signal using the information data;
   memory means for holding values, said memory means having a plurality of addressable memory locations, each memory location containing a value;
   means for addressing said memory means using the first signal to provide a first address component and using the second signal to provide a second address component; and
   mathematics means for performing mathematics utilizing a value from said memory means to generate error correction data.

2. An apparatus as set forth in claim 1, wherein the information data is received in groups which each have a first predetermined number of elements, and the error correction data is generated in groups each having a second predetermined number of elements.

3. An apparatus as set forth in claim 2, including memory means, accessible by a portion of said digital data transfer system other than said apparatus, for holding the information data elements and the error correction data elements, said accessible memory means includes memory array means having a plurality of array locations, each array location for holding an element, the number of array locations is equal to an integer multiple of the sum of the first and second predetermined numbers.

4. An apparatus as set forth in claim 2, including means for providing control signals using the clock signal, memory array means, having a plurality of array locations, for holding the information data elements and the error correction data elements, means for sending information data elements and error correction data elements to said memory array means in third groups, and means for controlling said means for sending in response to a control signal from said means for providing control signals to cause a first array location of said memory array means to always receive a first element of one of the third groups of the information data elements and error correction data elements.

5. An apparatus as set forth in claim 1, including means for providing counter signals using the clock signal, memory array means, having a plurality of array locations, for holding the information data and the error correction data, and means for sending the information data and error correction data to said memory array means using the counter signals to determine addresses.

6. An apparatus as set forth in claim 5, wherein said means for providing counter signals includes two modula counters for providing modula counter signals, said means for sending includes a decoder means for decoding one of the modula counter signals for an address portion.

7. An apparatus as set forth in claim 5, wherein said memory array means is accessible by a portion of said digital data transfer system other than said apparatus and is accessed by the other portion of said system to retrieve data using at least one of the counter signals.

8. An apparatus as set forth in claim 7, wherein said memory array means including means for placing sequentially sent elements into said array in correspondence with the determined array addresses to permit an interleaving of elements upon retrieval of elements from said memory array means in a sequential progression.

9. An apparatus as set forth in claim 1, including memory means, accessible by a portion of said digital data transfer system other than said apparatus, for storing the information data and the error correction data, means for sending the information data to said accessible memory means for storage therein, and means for sending the error correction data to said accessible memory means for storage therein.

10. An apparatus as set forth in claim 9, wherein the information data is received in groups which each have a first predetermined number of elements, the error correction data is generated in groups which each have a second predetermined number of elements, and further including means for alternately enabling said means for sending the information data and said means for sending the error correction data to cause alternate sending of elements of the information data and elements of the error correction data.

11. An apparatus as set forth in claim 10, wherein said alternate sending is during a time period for sending a portion of the current group of information data elements, and the number of elements in the portion of information data elements is equal to the second predetermined number.

12. An apparatus as set forth in claim 10, wherein the error correction data elements sent during said alternate sending are of a group of error correction elements which correspond to a previous group of information data elements.

13. An apparatus as set forth in claim 9, including means for providing a counter signal using the clock signal, said memory means using the counter signal for addressing.

14. An apparatus as set forth in claim 1, wherein said digital data transfer system is a television transmission system.

15. An apparatus for providing error correction data in a digital data transfer system, said apparatus comprising:
    means for receiving information data, the information data being received in groups which each have a first predetermined number of elements;
    means for generating error correction data in response to the information data, the error correction data being in groups each having a second predetermined number of elements; and
    memory means, accessible by a portion of said digital data transfer system other than said apparatus, for holding the information data elements and the error correction data elements, said accessible memory means including memory array means having a plurality of array locations, each array location for holding an element, the number of array locations being equal to an integer multiple of the sum of the first and second predetermined numbers.

16. An apparatus as set forth in claim 15, including means for receiving a clock signal, means for providing a first signal using the clock signal, means for providing a second signal using the information data, memory means having a plurality of addressable memory locations for holding values, and means for addressing said value holding memory means using the first signal to provide a first address component and using the second signal to provide a second address component, said means for generating using the values from said value holding memory means to generate the error correction data.

17. An apparatus as set forth in claim 15, wherein said accessible memory means includes memory array means having a plurality of array locations for holding information data elements and error correction data elements.

18. An apparatus as set forth in claim 17, including means for receiving a clock signal, means for providing control signals using the clock signal, means for sending information data elements and error correction data elements to said memory array means in third groups, and means for controlling said means for sending in response to a control signal from said means for providing control signals to cause a first array location of said memory array means to always receive a first element of one of the third groups of the information data elements and the error correction data elements.

19. An apparatus as set forth in claim 15, including means for receiving a clock signal, means for providing counter signals using the clock signal, said accessible array means including memory array means having a plurality of array locations for holding the information data and the error correction data, and further including means for sending the information data elements and error correction data elements to said memory array means using the counter signals to determine addresses.

20. An apparatus as set forth in claim 19, wherein said memory array means is accessible by the other portion of said digital data transfer system to retrieve data using at least one of the counter signals.

21. An apparatus as set forth in claim 20, wherein said memory array means including means for placing sequentially sent elements into said memory array means in correspondence with the determined array addresses to permit an interleaving of elements upon retrieval of elements from said memory array means in a sequential progression.

22. An apparatus as set forth in claim 19, wherein said means for sending uses two modula counter signals for addresses.

23. An apparatus as set forth in claim 15, including means for sending the information data to said accessible memory means for storage therein, and means for sending the error correction data to said accessible memory means for storage therein.

24. An apparatus as set forth in claim 23, wherein the information data is received in groups which each have a first predetermined number of elements, the error correction data is generated in groups which each have a second predetermined number of elements, and further including means for alternately enabling said means for sending the information data and said means for sending the error correction data to cause alternate sending of elements of the information data and elements of the error correction data.

25. An apparatus as set forth in claim 24, wherein said alternate sending is during a time period for sending a portion of the current group of information data elements, and the number of elements in the portion of information data elements is equal to the second predetermined number.

26. An apparatus as set forth in claim 25, wherein the error correction data elements sent during said alternate sending are of a group of error correction elements which correspond to a previous group of information data elements.

27. An apparatus as set forth in claim 15, including means for receiving a clock signal and means for providing a counter signal using the clock signal, said memory array means is accessible by the other portion of said digital transfer system to retrieve data using at least one of the counter signals.

28. An apparatus as set forth in claim 15, wherein said digital data transfer system is a television transmission system.

29. An apparatus for providing error correction data in a digital data transfer system, said apparatus comprising:
    means for receiving a clock signal;
    means for providing clock-based signals using the clock signal;
    means for receiving information data elements in first groups;
    means for generating error correction data elements using the information data elements and a clock-based signal from said means for providing clock-based signals, the error correction data elements being in second groups;
    memory means, including memory array means having a plurality of array locations, for holding the information data elements and the error correction data elements;
    means for sending information data and error correction data elements to said accessible memory means in third groups; and
    means for controlling said means for sending in response to a clock-based signal from said means for providing clock-based signals to cause a first array location of said memory array means to always receive a first element of one of the third groups of the information data and error correction data.

30. An apparatus as set forth in claim 29, wherein said means for providing clock-based signals includes counter means for providing a counter signal using the clock signal, said apparatus further including means for providing a data-based signal using the information data, memory means having a plurality of addressable memory locations for holding values, and means for addressing said value holding memory means using the counter signal to provide a first address component and using the data based signal to provide a second address component, the error correction data is generated using the values from said value holding memory means.

31. An apparatus as set forth in claim 30, wherein said means for providing clock-based signals includes modula counter means for providing two modula counter signals.

32. An apparatus as set forth in claim 30, wherein said means for providing clock-based signals includes means for providing control signals using the clock signal, said means for sending information data and error correction data elements send elements to said memory array means in third groups in response to a control signal.

33. An apparatus as set forth in claim 30, wherein said means for providing clock-based signals includes means for providing counter signals using the clock signal, said means for sending the information data and error correction data sends data to said memory array means using the counter signals for addressing.

34. An apparatus as set forth in claim 33, wherein said memory array means is accessible by a portion of said digital data transfer system other than said apparatus and is accessed by the other portion of said system to retrieve data using at least one of the counter signals.

35. An apparatus as set forth in claim 34, wherein said memory array means including means for placing sequentially sent elements into said array locations in correspondence with the determined array addresses to permit an interleaving of elements upon retrieval of elements from said array locations in a sequential progression.

36. An apparatus as set forth in claim 35, wherein said means for sending uses two modula counter signals for addresses.

37. An apparatus as set forth in claim 30, wherein the information data is received in groups which each have a first predetermined number of elements, the error correction data is generated in groups which each have a second predetermined number of elements, said means for sending alternately sends elements of the information data and elements of the error correction data.

38. An apparatus as set forth in claim 37, wherein said alternate sending is during a time period for sending a portion of the current group of information data elements, and the number of elements in the portion of information data elements is equal to the second predetermined number.

39. An apparatus as set forth in claim 38, wherein the error correction data elements sent during said alternate sending are of a group of error correct ion elements for a previous group of information data elements.

40. An apparatus as set forth in claim 29, wherein said digital data transfer system is a television transmission system.

41. An encoder that provides error correction data in a digital data transfer system, said encoder comprising:
a memory that holds values, said memory has a plurality of addressable memory locations, each memory location contains a value;
a modula counter and register array that performs mathematics utilizing values from said memory to generate error correction data;
at least one counter that receives a clock signal and that provides a first signal using the clock signal;
a data register that receives information data; and
a modula add device that interacts with said modula counter and register array and that uses the information data to provide a second signal; and wherein
said memory is addressed using the first signal to provide a first address component and using the second signal to provide a second address component.

42. An encoder as set forth in claim 41, wherein said data register receives the information data in groups which each have a first predetermined number of elements, and said modula counter and register array generates the error correction data in groups each having a second, different predetermined number of elements.

43. An encoder as set forth in claim 42, including an accessible memory, accessible by a portion of said digital data transfer system other than said encoder, that holds the information data elements and the error correction data elements, said accessible memory has a plurality of memory array locations that each hold an element, the number of array locations is equal to an integer multiple of the sum of the first and second predetermined numbers.

44. An encoder as set forth in claim 42, including a decoder that provides control signals using the clock signal, a memory array with a plurality of array locations that holds the information data elements and the error correction data elements, a multiplexor that sends information data elements and error correction data elements to said memory array in third groups, and a selector that controls said multiplexor in response to a control signal from said decoder to cause a first array location of said memory array to always receive a first element of one of the third groups of the information data elements and error correction data elements.

45. An encoder as set forth in claim 44, wherein said counter is a first modula counter, and said encoder includes a second modula counter, said modula counters provide modula counter signals, and a decoder that decodes one of the modula counter signals for an address portion of said memory array.

46. An encoder as set forth in claim 45, wherein said memory array is accessible by a portion of said digital data transfer system other than said encoder and is accessed by said other portion of said system to retrieve data using at least one of the modula counter signals.

47. An encoder as set forth in claim 41, including an accessible memory, accessible by a portion of said digital data transfer system other than said encoder, stores the information data and the error correction data, and a multiplexor that sends the information data and the error correction data to said accessible memory for storage therein.

48. An encoder as set forth in claim 47, wherein the information data is received in groups which each have a first predetermined number of elements, the error correction data is generated in groups which each have a second predetermined number of elements, and said multiplexor is controlled to cause alternate sending of elements of the information data and elements of the error correction data.

49. An encoder as set forth in claim 48, wherein said alternate sending is during a time period for sending a portion of the current group of information data elements, and the number of elements in the portion of information data elements is equal to the second predetermined number.

50. An encoder as set forth in claim 48, wherein the error correction data elements sent during said alternate sending are of a group of error correction elements which correspond to a previous group of information data elements.

51. An encoder that provides error correction data in a digital data transfer system, said encoder comprising:

a data register that receives information data, the information data being received in groups which each have a first predetermined number of elements;

a modula counter and register array that generates error correction data in response to the information data, the error correction data being in groups each having a second predetermined number of elements; and an accessible memory, accessible by a portion of said digital data transfer system other than said encoder, holds the information data elements and the error correction data elements, said accessible memory has a plurality of array locations, each array location holding an elements, the number of array locations being equal to an integer multiple of the sum of the first and second predetermined numbers.

52. An encoder as set forth in claim 51, including a second memory that has a plurality of addressable memory locations that hold values, a modula counter and register array that generates error correction data using the values from said memory, a counter that receives a clock signal and that provides a first signal using the clock signal, a modula add device that interacts with the modula counter and register array and that uses the information data to provide a second signal, and said second memory is addressed using the first signal to provide a first address component and using the second signal to provide a second address component.

53. An encoder as set forth in claim 51, wherein said accessible memory has a plurality of array locations for holding information data elements and error correction data elements.

54. An encoder as set forth in claim 53, including a counter that receives a clock signal, a decoder that interacts with said counter to provide control signals using the clock signal, a multiplexor that sends information data elements and error correction data elements to said memory array in third groups, and a selector that controls said multiplexor in response to a control signal from said decoder to cause a first array location of said accessible memory to always receives a first element of one of the third groups of the information data elements and the error correction data elements.

55. An encoder as set forth in claim 51, including a counter that receives a clock signal and that provides counter signals using the clock signal, said accessible memory has a plurality of array locations that hold the information data and the error correction data, and further including a multiplexor that sends the information data elements and error correction data elements to said memory array, and a decoder that determines addresses using the counter signals.

56. An encoder as set forth in claim 55, wherein said memory array is accessible by the other portion of said digital data transfer system to retrieve data using at least one of the counter signals.

57. An encoder for providing error correction data in a digital data transfer system, said encoder comprising:

a counter device that receives a clock signal and that provides clock-based signals using the clock signal;

a data register that receives information data elements in first groups;

a modula counter and register array that generates error correction data elements using the information data elements and a clock-based signal, the error correction data elements being in second groups;

a memory that has a plurality of array locations that hold the information data elements and the error correction on data elements;

a multiplexor that sends information data and error correction data elements to said memory in third groups; and a selector that controls said multiplexor in response to a clock-based signal to cause a first array location of said memory to always receive a first element of one of the third groups of the information data and error correction data.

* * * * *